US008493500B2

(12) United States Patent
Doepke et al.

(10) Patent No.: US 8,493,500 B2
(45) Date of Patent: Jul. 23, 2013

(54) AUTO EXPOSURE BLOWOUT PREVENTION

(75) Inventors: Frank Doepke, San Jose, CA (US);
Ralph Brunner, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 393 days.

(21) Appl. No.: 12/912,943

(22) Filed: Oct. 27, 2010

(65) Prior Publication Data
US 2012/0105672 A1    May 3, 2012

(51) Int. Cl.
*H04N 5/235* (2006.01)
*G03B 7/00* (2006.01)

(52) U.S. Cl.
USPC ........................................ 348/362; 348/229.1

(58) Field of Classification Search
USPC .................. 348/222.2, 229.1, 362, 364–366
See application file for complete search history.

(56) References Cited

U.S. PATENT DOCUMENTS

| 2004/0085475 | A1* | 5/2004 | Skow et al. | 348/362 |
| 2006/0221223 | A1* | 10/2006 | Terada | 348/333.05 |
| 2006/0268151 | A1* | 11/2006 | Yamashita | 348/362 |
| 2007/0052838 | A1* | 3/2007 | Zhang | 348/362 |
| 2009/0027545 | A1* | 1/2009 | Yeo et al. | 348/362 |
| 2010/0091176 | A1* | 4/2010 | Cha et al. | 348/365 |

OTHER PUBLICATIONS

Hannemyr, Gisle, "Exposing for the Highlights (beta); Adapting the Zone System to Digital Photography", http://dpanswers.com/content/tech_zonesystem.php, (2010).

* cited by examiner

*Primary Examiner* — Kelly L Jerabek
(74) *Attorney, Agent, or Firm* — Wong, Cabello, Lutsch, Rutherford & Brucculeri LLP

(57) ABSTRACT

Systems, methods, and a computer readable medium for performing an improved blowout prevention process in an image capture device are provided to compensate for occurrences of exposure "blowouts," i.e., areas in a captured image where pixel brightness exceeds the sensor's dynamic range of capturing capability. In one embodiment, the captured image's histogram may be analyzed to determine if the image is indicative of the presence of exposure blowouts. Once it has been determined that there likely are blowouts in the image, an exposure bias for the image capture device may be set accordingly. Particularly, the exposure value (EV) for the image capture device may be gradually corrected, e.g., by one-eighth of a stop per captured frame, until the image histogram is no longer indicative of blown out regions, at which point the image capture device's exposure value may gradually be corrected back to "normal," i.e., non-exposure bias compensated, levels.

27 Claims, 13 Drawing Sheets

AUTO EXPOSURE BLOWOUT PREVENTION

BACKGROUND

Today, many personal electronic devices come equipped with digital cameras. Often, these devices perform many functions, and, as a consequence, the digital image sensors included in these devices must often be smaller than the sensors in conventional cameras. Further, the camera hardware in these devices often have smaller dynamic ranges and lack sophisticated features sometimes found in larger, professional-style conventional cameras such as manual exposure controls and manual focus. Thus, it is important that digital cameras in personal electronic devices be able to produce visually appealing images in a wide variety of lighting and scene situations with limited or no interaction from the user, as well as in a computationally and cost effective manner.

One feature that has been implemented in some digital cameras to compensate for lack of dynamic range and create visually appealing images is known as "auto exposure." Auto exposure (AE) can be defined generally as any algorithm that automatically calculates and/or manipulates certain camera exposure parameters, e.g., exposure time, ISO, gain, or f-number, in such a way that the currently exposed scene is captured in a desirable manner. For example, there may be a predetermined optimum brightness value for a given scene that the camera will try to achieve by adjusting the camera's exposure value. Exposure value (EV) can be defined generally as: $\log_2 N^2/t$, wherein N is the relative aperture (f-number), and t is the exposure time (i.e., "shutter speed") expressed in seconds. Some auto exposure algorithms calculate and/or manipulate the exposure parameters such that a mean, center-weighted mean, median, or more complicated weighted value (as in matrix-metering) of the image's brightness will equal a predetermined optimum brightness value in the resultant, auto exposed scene.

Auto exposure algorithms are often employed in conjunction with image sensors having small dynamic ranges because the dynamic range of light in a given scene, i.e., from absolute darkness to bright sunlight, is much larger than the range of light that some image sensors—such as those often found in personal electronic devices—are capable of capturing. In much the same way that the human brain can drive the diameter of the eye's pupil to let in a desired amount of light, an auto exposure algorithm can drive the exposure parameters of a camera so as to attempt to most effectively capture the desired portions of a scene. The difficulties associated with image sensors having small dynamic ranges are further exacerbated by the fact that most image sensors in personal electronic devices are comparatively smaller than those in larger cameras, resulting in a smaller number of photons that can hit any single photosensor of the image sensor.

Auto exposure algorithms work to drive exposure parameters, thus, it is problematic when such auto exposure algorithms are "tricked" by the composition of a particular scene. For example, with an auto exposure algorithm using a center-weighted mean to expose an outdoor scene that is brightly lit by the sun but has a dark object at its center, the auto exposure algorithm may be "tricked" by large numbers of heavily-weighted, dark pixels near the center of the image, and thus act to change the camera's exposure parameter values, e.g., by lengthening the exposure time—incorrectly assuming (based on the image's predominantly dark center) that it is looking at an overall dark image that would benefit from an increased exposure time. However, lengthening the exposure time could have the unintended consequence of over—exposing the bright areas around the peripheral parts of the scene, potentially causing "blowouts" to occur, that is, areas in the image where pixel brightness exceeds the sensor's dynamic range of capturing capability, thus losing all image detail information in those areas of the image and producing only pure white pixels.

Thus, there is need for systems, methods, and a computer readable medium for performing an improved auto exposure blowout prevention process implemented in an image capture device or video capture device, e.g., a camera circuit in a digital camera, mobile phone, personal data assistant (PDA), portable music player, or laptop/desktop/tablet computer, to detect and compensate for occurrences of exposure blowouts caused by auto exposure algorithms that have been "tricked" by the composition of a particular scene. Additionally, such techniques may be able to distinguish between properly-captured specular highlights, for example, the glint or shine on a pair of eyeglasses (which should not be corrected for) and blowouts caused by an auto exposure algorithm overexposing a scene more than was necessary.

SUMMARY

Every auto exposure algorithm can potentially produce the wrong exposure for a given scene. In some cases, overexposure can be caused by the particular subject matter composition of the scene. Overexposure in such images may actually cause the brightest areas of the image to be "blown out," that is, the brightness of pixels in those areas may exceed the sensor's dynamic range of capturing capability, thus losing all information in those areas of the image and producing only pure white pixels in the resultant image. Likewise, underexposure in an image may actually cause the darkest areas of the image to be "blown out," that is, the darkness of pixels in those areas may exceed the sensor's dynamic range of capturing capability, thus losing all information in those areas of the image and producing only pure black pixels in the resultant image.

In some situations, blowouts may occur as a result of an intentional artistic choice of the photographer, or they may be an accurate depiction of areas of extreme brightness in the scene, such as the reflection of the Sun off the surface of a body of water. In these cases, the loss of detail in the blown out areas may be intentional, tolerable, or even appropriate for the situation. However, in other situations, the blowouts are instead caused by an auto exposure algorithm "believing" that it is making the correct adjustments to the camera's exposure parameters (e.g., shutter speed, aperture, ISO, gain, etc.) in order to capture the scene in a desired way, when, in reality, the choices made by the auto exposure algorithm turn out to be suboptimal for the scene's composition. Under certain circumstances, it is an inescapable consequence of auto exposure algorithms that some scenes will end up being exposed in a suboptimal way. In other words, auto exposure algorithms cannot, in general, completely mimic the exposure choices that the trained eye of a seasoned photographer is capable of making. It is in these cases where it would be advantageous to have a "blowout prevention" stage in the image processing pipeline in conjunction with the running of any auto exposure algorithm that would be capable of correcting the camera's exposure settings in an effort to reduce unwanted or unintentional exposure blowouts.

A "blowout prevention" process as discussed herein may undertake an image histogram analysis and, based at least in part on the distribution of the histogram, make a determination as to whether a particular image captured by an image capture device is indicative of exposure blowouts. In one embodiment, the process may first determine if the image is a "candidate" for having exposure blowouts by determining if the number of pixels in an upper portion of the image histogram, e.g., the four highest half-stops of the image capture device's dynamic range, is greater than the number of pixels in a lower portion of the image histogram, e.g., the six lowest half-stops of the image capture device's dynamic range, by a predetermined threshold amount. It should be noted that the use of half-stops to define the upper portion and/or lower portion of the image histogram as described above comprises merely one potential means of empirically dividing the image histogram, and is by no means the only way in which one might define the portion boundaries within a given image histogram. For example, one implementation could pick a division of the image histogram that does not align itself with half, third, or any other particular f-stop range. If a given image is found to be a candidate for having blown out areas, a "confirmation analysis" may then be undertaken to ensure that the image histogram is indeed indicative of unintentional blown out regions rather than simply a result of properly-captured specular highlights within the image, for example, the glint or shine on a pair of eyeglasses.

In one embodiment, the so-called confirmation analysis may check to see if the number of pixels in the n-highest histogram "buckets," i.e., bins, of the image histogram is greater than the number of pixels in the upper portion of the image histogram by a predetermined threshold amount, where 'n' is any predetermined integer value. If so, it may be determined that the captured image is indicative of one or more blown out regions. Once it has been determined that there are likely blown out regions in the image, an "exposure bias" or "exposure compensation" parameter for the camera, i.e., a change to the camera's exposure parameters on top of what is suggested by the auto exposure algorithm (i.e., based on the auto exposure algorithm's chosen method of scene composition analysis), may be set accordingly. In one embodiment, the camera's exposure parameters may be corrected gradually, e.g., by one-eighth of a stop per captured frame, limited by some upper and lower limits of exposure compensation, until the image histogram is no longer indicative of the image being a candidate for blown out regions. At that point, the camera's exposure parameters may gradually be corrected back to "normal," i.e., to non-exposure bias compensated levels.

In other embodiments, similar techniques could be applied to the most shadowy regions of an image as well, i.e., "dark blowouts"—those regions of the image where, due to the camera's exposure settings, all shadow detail is lost and the pixels in those regions are rendered as pure black.

Because of advantages gained by the embodiments disclosed herein, the "blowout prevention" processes and techniques described herein may be implemented in conjunction with any auto exposure algorithm employed by an image capture or video capture device. The embodiments disclosed herein present novel and non-obvious methods of distinguishing between "good" overexposure due to specular highlights and "bad" overexposure due to the decisions made by an auto exposure algorithm, while allowing for the former and correcting for the latter. Further, the "blowout prevention" processes and techniques described herein may be implemented directly in a personal electronic device's software, making the method readily applicable to any number of personal electronic devices possessing programmable control devices and camera circuits, such as: digital cameras, digital video cameras, mobile phones, personal data assistants (PDAs), portable music players, or laptop/desktop/tablet computers.

DETAILED DESCRIPTION

This disclosure pertains to systems, methods, and a computer readable medium for performing improved auto exposure blowout prevention processes in an image capture device or video capture device, e.g., a camera circuit in a digital camera, mobile phone, personal data assistant (PDA), portable music player, or laptop/desktop/tablet computer, to compensate for occurrences of exposure "blowouts," i.e., areas in a captured image where pixel brightness exceeds the sensor's dynamic range of capturing capability. While this disclosure discusses new techniques for auto exposure blowout prevention, one of ordinary skill in the art would recognize that the techniques disclosed may also be applied to other contexts and applications as well. The techniques disclosed herein are applicable to any number of electronic devices with programmable control devices and camera circuits, such as: digital cameras, digital video cameras, mobile phones, personal data assistants (PDAs), portable music players, computers, and conventional cameras. An embedded processor, such as a Cortex® A8 with the ARM® v7-A architecture, provides a versatile and robust programmable control device that may be utilized for carrying out the disclosed techniques. (CORTEX® and ARM® are registered trademarks of the ARM Limited Company of the United Kingdom.)

In the interest of clarity, not all features of an actual implementation are described in this specification. It will of course be appreciated that, in the development of any such actual implementation (as in any development project), numerous decisions must be made to achieve the developers' specific goals (e.g., compliance with system- and business-related constraints), and that these goals will vary from one implementation to another. It will be appreciated that such development effort might be complex and time-consuming, but would nevertheless be a routine undertaking for those of ordinary skill having the benefit of this disclosure. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Figure 1:
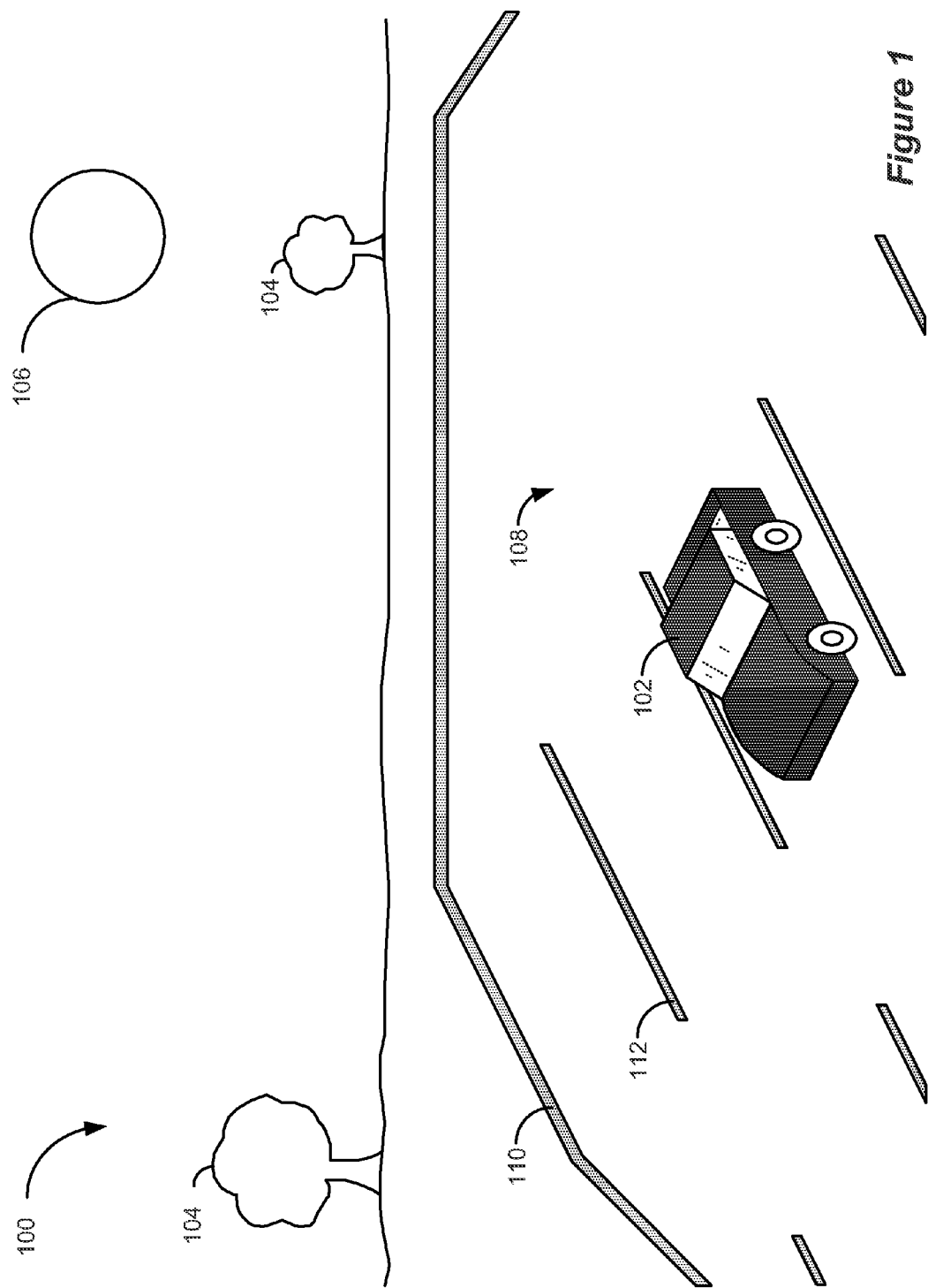
FIG. 1 illustrates a brightly-lit outdoor scene with a centered, darkly-colored object, in accordance with one embodiment.

Referring now to FIG. 1, a brightly-lit outdoor scene 100 with a centered, darkly-colored object, car 102, is shown. The scene 100 also includes the Sun 106, background objects, e.g., trees 104, and a brightly-lit parking lot surface 108. Regions of parking lot 108 surrounding darkly-colored car 102 will likely have much higher captured luminance values than regions comprising the body of car 102. This is important because, especially in the case of brightly-lit outdoor scenes, such as that shown in FIG. 1, the Sun 106 (or any number of other possible back lighting sources) can have a large—and often detrimental—effect on the way a camera using a standard auto exposure algorithm chooses to meter the scene. Because of the very large luminance, i.e., brightness, values that will be measured in the majority of the pixels in the scene due to the Sun 106 and the reflective nature of parking lot 108, curb 110, and parking lines 112, cameras using a "simple mean" auto exposure algorithm, i.e., an auto exposure algorithm where the values of the camera's exposure parameters are set based on the overall mean brightness value of all the pixels in an image, will tend to meter and expose the scene in such a manner that dark objects in the scene will actually end up underexposed so as to avoid overexposing the already very bright background of the image. Thus, "simple mean" auto exposure algorithms do not produce the most favorable results for many scene compositions, so more complex auto exposure algorithms—such as center-weighted mean or matrix metering—are often employed by auto exposure algorithms. Using a more complex auto exposure algorithm, e.g., a center-weighted mean auto exposure algorithm, may give the camera a better chance of properly exposing a scene such as scene 100, but may still result in unintentional blown out regions, as will be discussed below.

Figure 2:
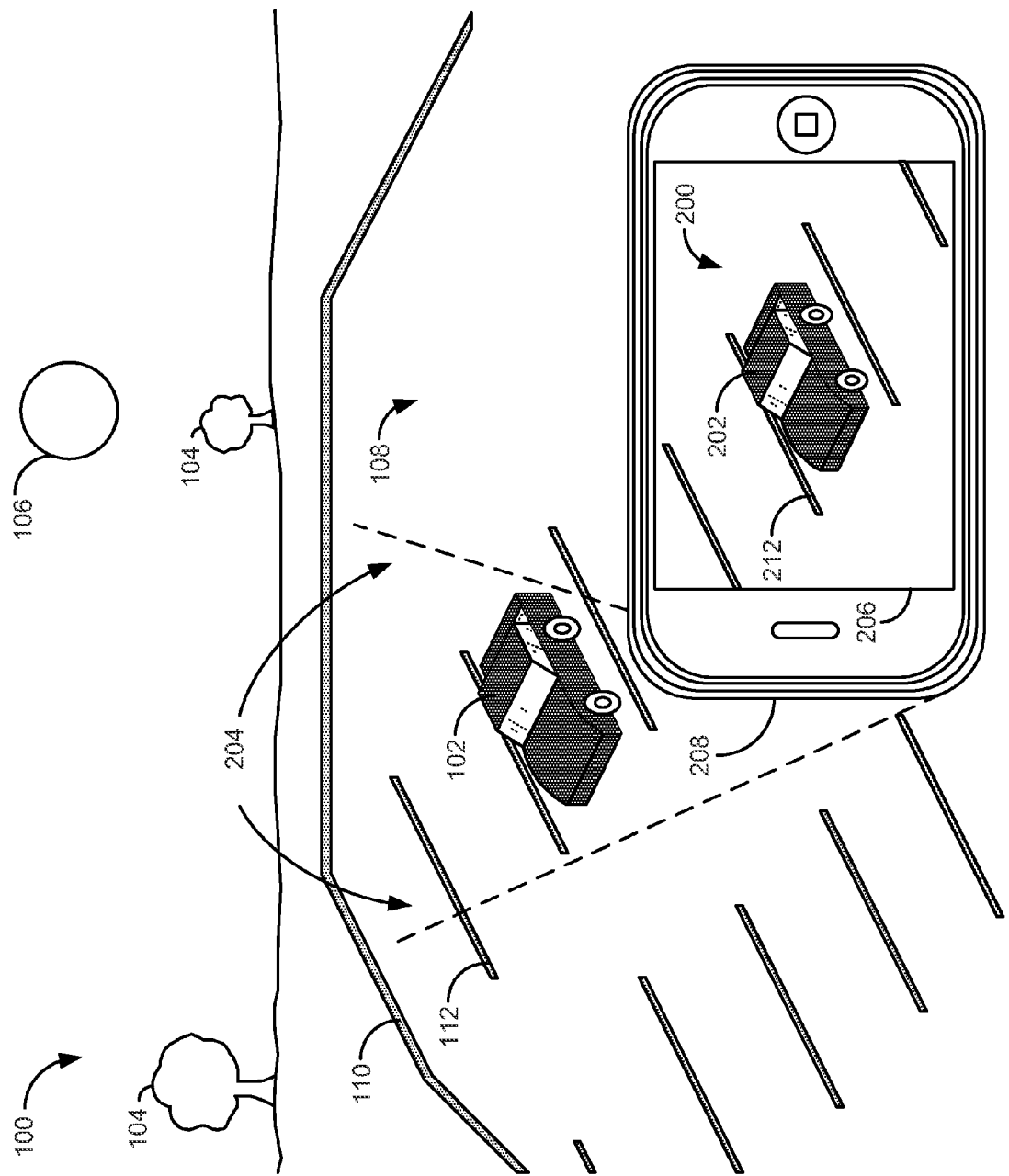
FIG. 2 illustrates a brightly-lit outdoor scene with a centered, darkly-colored object, as viewed on a camera's preview screen, in accordance with one embodiment.

Referring now to FIG. 2, a brightly-lit outdoor scene 200 with a centered, darkly-colored object, car 202, and parking lines 212 is shown as viewed on a camera device 208's preview screen 206, in accordance with one embodiment. The dashed lines 204 indicate the viewing angle of the camera lens (not shown) on the reverse side of camera device 208. Although camera device 208 is shown here as a mobile phone, the teachings presented herein are equally applicable to any electronic device possessing a camera, such as, but not limited to: digital video cameras, personal data assistants (PDAs), portable music players, laptop/desktop/tablet computers, or conventional cameras. Each object in scene 100 could have a corresponding representation in scene 200 as viewed on camera device 208's preview screen 210. For example, car 102 is represented as darkly-colored object 202 on camera device 208's preview screen 210.

As shown in FIG. 2, the photographer has chosen to place the darkly-colored object, car 202, prominently in the center of camera device 208's preview screen 206. The placement and size of car 202 in the image being captured can have a large effect on the decisions made by an auto exposure algorithm, e.g., a center-weighted mean auto exposure algorithm, as will be discussed below.

Figure 3:
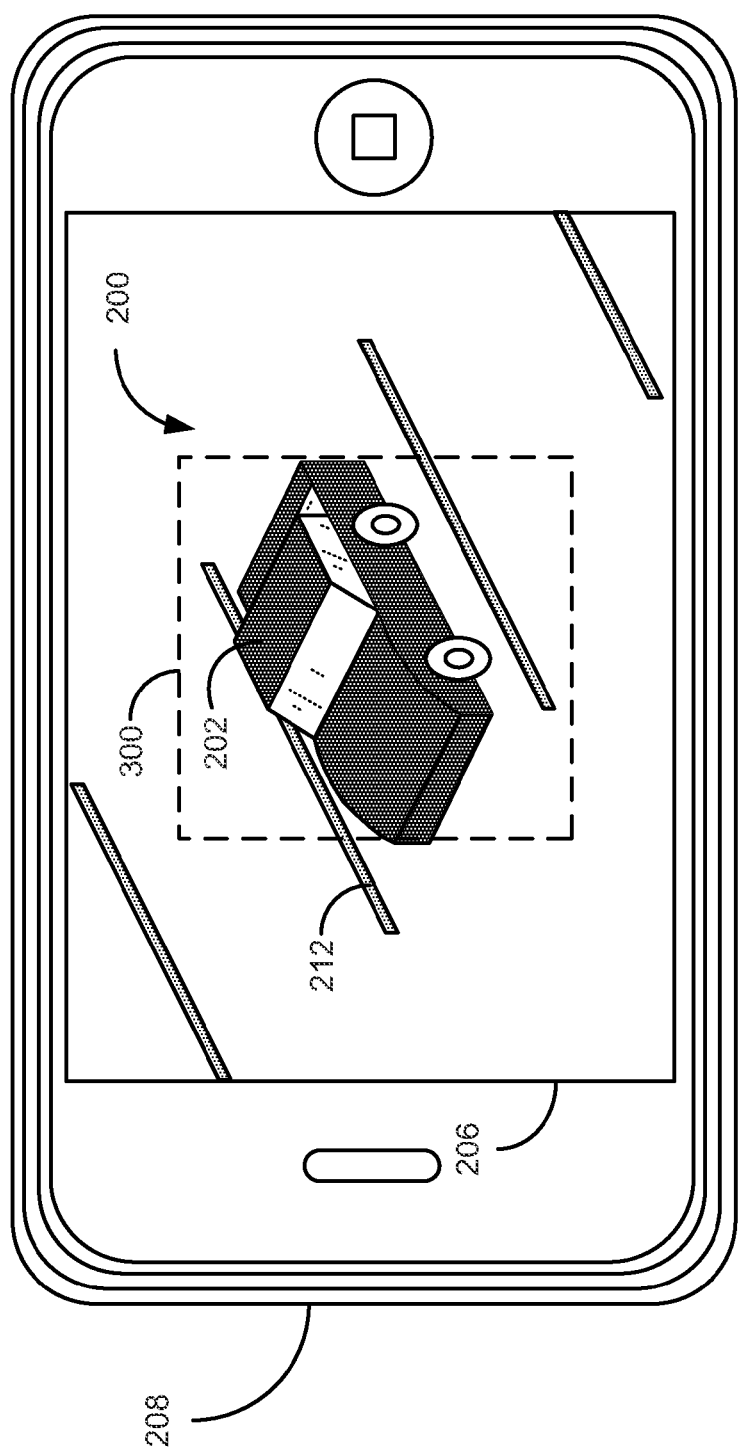
FIG. 3 illustrates an exposure metering region for a center-weighted auto exposure algorithm, in accordance with one embodiment.

Referring now to FIG. 3, a typical exposure metering region, exposure metering rectangle 300, for an outdoor scene 200 with a centered, darkly-colored object 202 is shown, in accordance with one embodiment. In this exemplary embodiment, a center-weighted mean auto exposure algorithm is employed that will more heavily weight the brightness values of pixels located within centralized exposure metering rectangle 300 when making a determination of how to set the camera's exposure parameter values. Using such a "center-weighted" auto exposure algorithm is often beneficial because the most important objects within a scene are often located centrally to the captured image. By more heavily weighting those central pixels, the auto exposure algorithm is more likely to make exposure decisions that lead to visually pleasing results, that is, images wherein the important parts of the image are exposed correctly. In other embodiments, exposure metering rectangle 300 could be of other shapes and sizes, or could comprise multiple exposure metering regions, and the weights assigned to various regions of the image can vary between different auto exposure algorithms.

Figure 4:
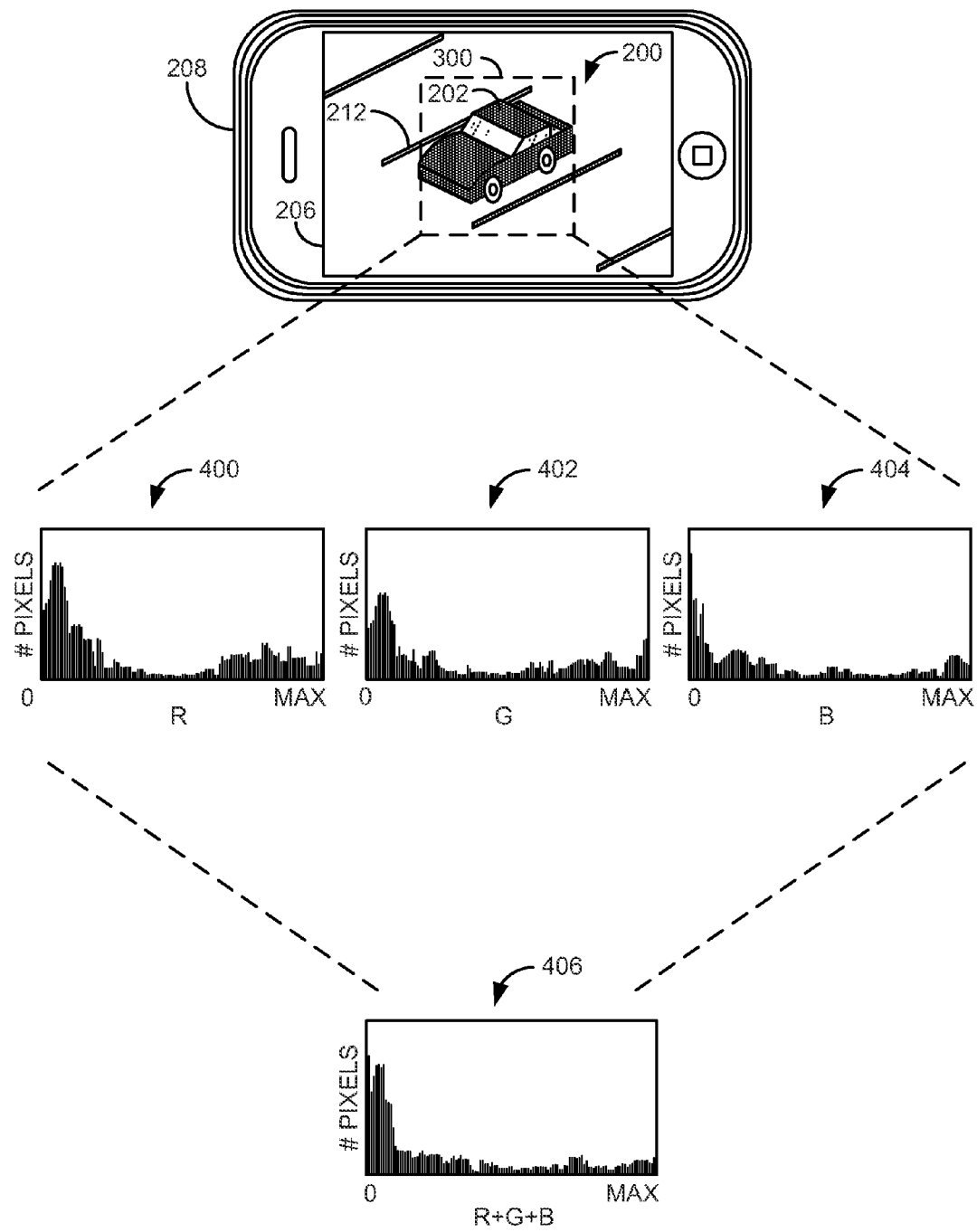
FIG. 4 illustrates image histogram data for an exposure metering region, in accordance with one embodiment.

Referring now to FIG. 4, image histogram data 400/402/404/406 is shown for pixels within an exposure metering region 300, in accordance with one embodiment.

In this example, exposure metering region 300 may be thought of as the "histogram sampling region." Image histograms may be used to show the brightness or individual color channel dynamic range of the captured image. As is understood in the art, most camera sensors are capable of producing brightness histograms (e.g., brightness histogram 406) representing the combined color channel histograms for each captured image. Some cameras are also capable of producing separate RGB color histograms (e.g., color histograms 400/402/404) for each captured image. RGB color histograms 400/402/404 show the dynamic range for each of the three color channels for pixels located within the histogram sampling region comprising exposure metering region 300. The x-axes of the histograms 400/402/404/406 represent intensity value bins, or "buckets," ranging from 0 (i.e., black) to the maximum intensity value (i.e., white). For example, with 8-bit intensity values, the maximum intensity value assigned to a pixel would be $2^8-1$, or 255. The y-axes of the histograms 400/402/404/406 represent the number of pixels from within exposure metering region 300 having a given intensity value, i.e., the number of pixels in any given intensity value "bucket." In applications where it is not important to separate out the various color channels, it is possible to sum the channel intensity information, resulting in single, combined brightness histogram 406, labeled with "R+G+B" along its x-axis.

Analysis of the distribution of an image histogram, such as brightness histogram 406, has been found by the Applicants to be beneficial in determining whether an image is indicative of exposure blowouts. As shown in FIG. 4, each of histograms 400/402/404 shows a large percentage of pixels in the lower portion of the histogram, i.e., toward the '0' end of the histogram graph. This result is to be expected because the histogram sampling region 300 in this example mainly comprises a dark object, i.e., car 202. Likewise, combined brightness histogram 406, which comprises the combined information from each color channel's pixel intensities, also shows the pixels to be clustered more heavily in the lower portion of the image histogram. If a standard "center-weighted" auto exposure algorithm were used on scene 200, it is likely that the camera's exposure parameters would be set in a way to let more light into the sensor, e.g., increased exposure time, increased gain levels, etc. The AE algorithm may make this decision based on the heavily-weighted nature of the pixels near the center of the image that, as described above, tend to fall within the lower portion of the image's brightness histogram. However, as will be discussed below in reference to FIG. 5, such auto exposure decisions could unintentionally cause highlight blowouts in other areas of the image. While performing this type of image histogram analysis or other similar image histogram analysis processes, there is a risk of returning unstable results due to, e.g., noise in the low intensity regions, i.e., shadows, and/or "stuck pixels" on the image sensor. Thus, it is important to build appropriate margins of error into any such process.

Figure 5:
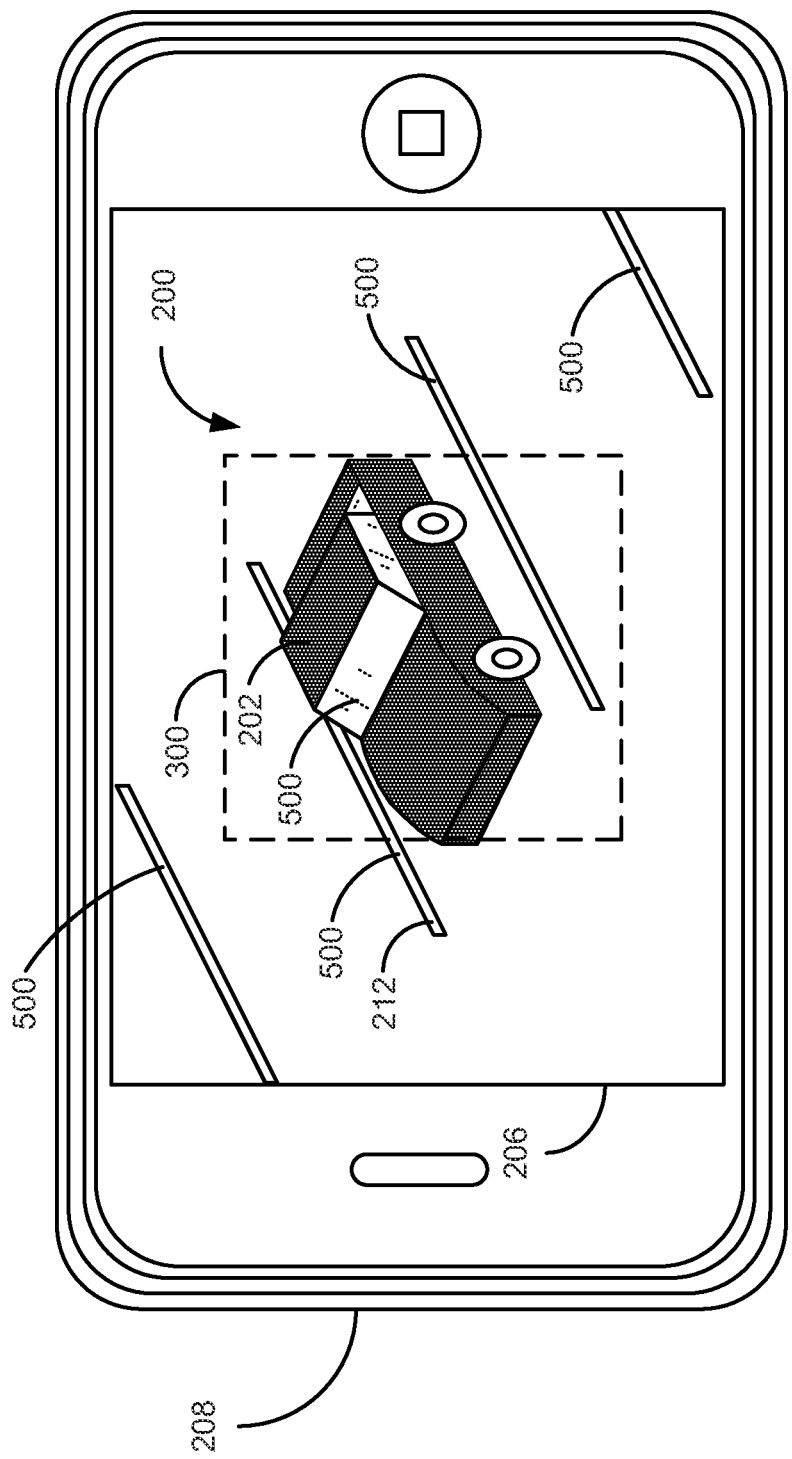
FIG. 5 illustrates a plurality of blown out areas within an image, in accordance with one embodiment.

Referring now to FIG. 5, an image with a plurality of blown out areas 500 is shown, in accordance with one embodiment. As mentioned above, blown out highlights in an image occur when pixel brightness exceeds the image sensor's dynamic range of capturing capability, thus losing all information in those areas of the image and producing only pure white pixels. These regions of pure white pixels are represented by the white-filled areas 500 in FIG. 5. As may be seen in FIGS. 1-4, the curb 110 and parking lines 112/212 near car 202 should have a grayish color with visible texture detail. As can be seen from FIG. 5, however, the parking lines 212 are now represented by pure white pixels, and no image detail may be perceived in the blown out areas 500. While a small number of appropriate blowouts 500 may be tolerable in some images, e.g., on the windshield of car 202, large areas of highlight blowouts, such as the large white regions comprising parking lines 212, would likely represent an undesired and/or unintentional amount of overexposure and loss of detail caused by the particular auto exposure algorithm employed.

Figure 6:
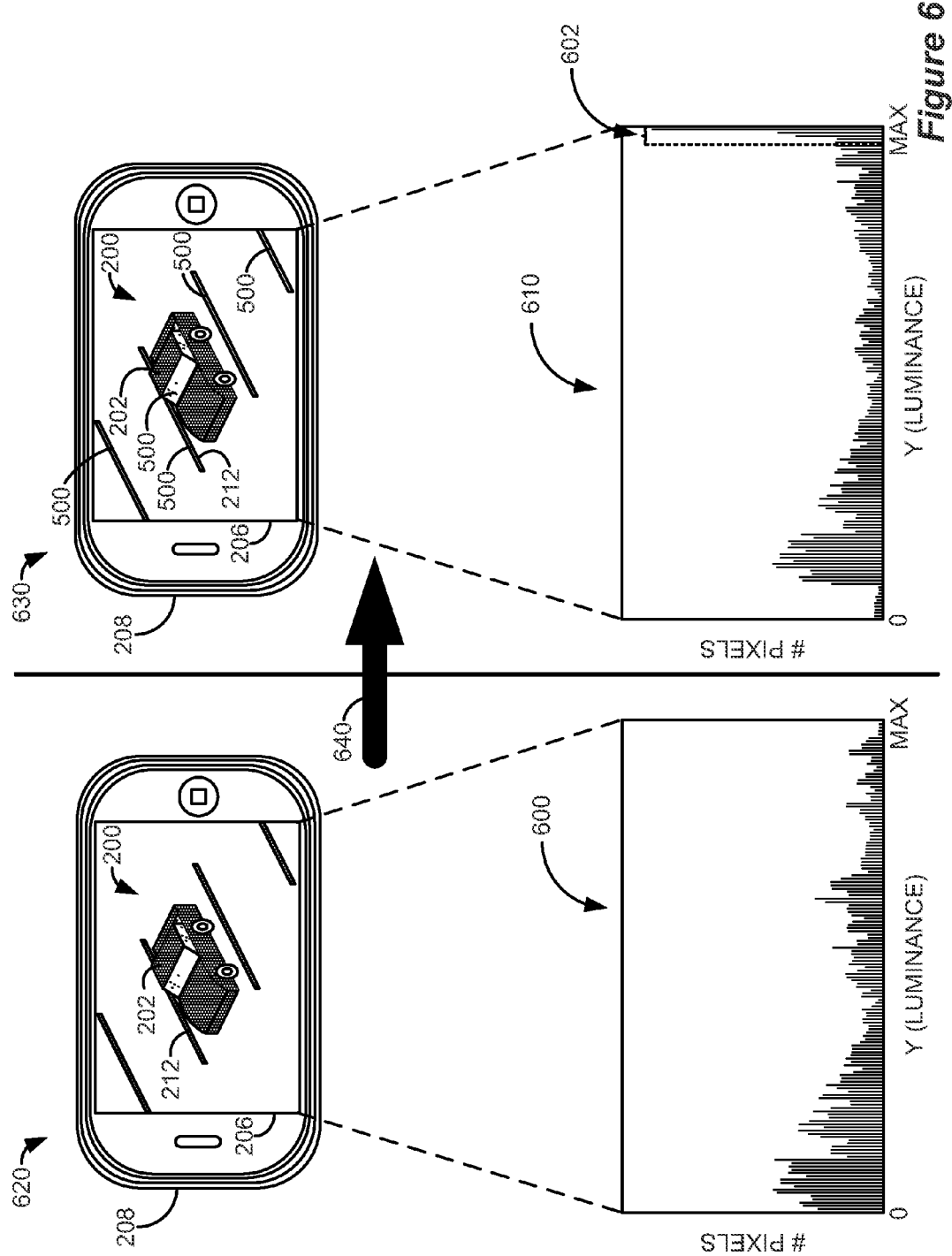
FIG. 6 illustrates image histogram data for an image before and after the execution of an auto exposure algorithm on the captured digital image, in accordance with one embodiment.

Referring now to FIG. 6, image histogram data for an image before and after the execution of an AE algorithm 640 on the captured digital image is shown, in accordance with one embodiment. As is shown on the left side 620 of FIG. 6, image histogram data 600 represents the luminance histogram data for the entire image displayed on the preview screen 206 of camera device 208 before the execution of an AE algorithm 640. Image histogram data 600 is indicative of the fact that the dark pixels comprising car 202 will be located in the histogram buckets in the lower portion of the image histogram. Image histogram data 600 is also indicative of the fact that many other pixels comprising the parking lot surface and parking lines 212 will be located in the histogram buckets in the middle and upper portions of the image histogram.

As shown on the right side 630 of FIG. 6, image histogram data 610 represents the luminance histogram data for the entire image displayed on the preview screen 206 of camera device 208 after the execution of an AE algorithm 640. The execution of the AE algorithm is represented by arrow 640. Image histogram data 610 is indicative of the fact that the pixels originally located in the lowest buckets of the image histogram 600 have been shifted towards the middle portion of the image histogram 610 by the execution of the AE algorithm 640. Additionally, some of the pixels from the mid tones from the original image histogram data 600 have been pushed up in to the upper portion of the image histogram data 610, and certain pixels originally located in the upper portions of the image histogram data 600 now occupy the highest n-buckets 602 of resultant image histogram 610. Pixels located in the highest n-buckets 602 of resultant image histogram 610 may be pure white or close enough to pure white that they may be considered to be exposure blowouts in the resultant image. In the example of FIG. 6, it can be determined that the blown out pixels likely comprise the pixels making up parking lines 212, whose gray color and texture detail have been blown out and replaced with white pixels that lack any image detail.

Due to the number of blown out areas 500 in the image shown in FIG. 6, it is not surprising that the "highest n-buckets" 602 in image histogram reflect a substantial number of pixels. With 8-bit values, the highest bucket represents the number of pixels with a brightness value of 255, i.e., pure white. As will be discussed below, the presence of a large number of pixels in the "highest n-buckets" may be useful to a blowout prevention process in accordance with the embodiments disclosed herein for confirming whether a predominantly bright image actually has unwanted exposure blowouts or is merely indicative of specular highlights.

Figure 7:
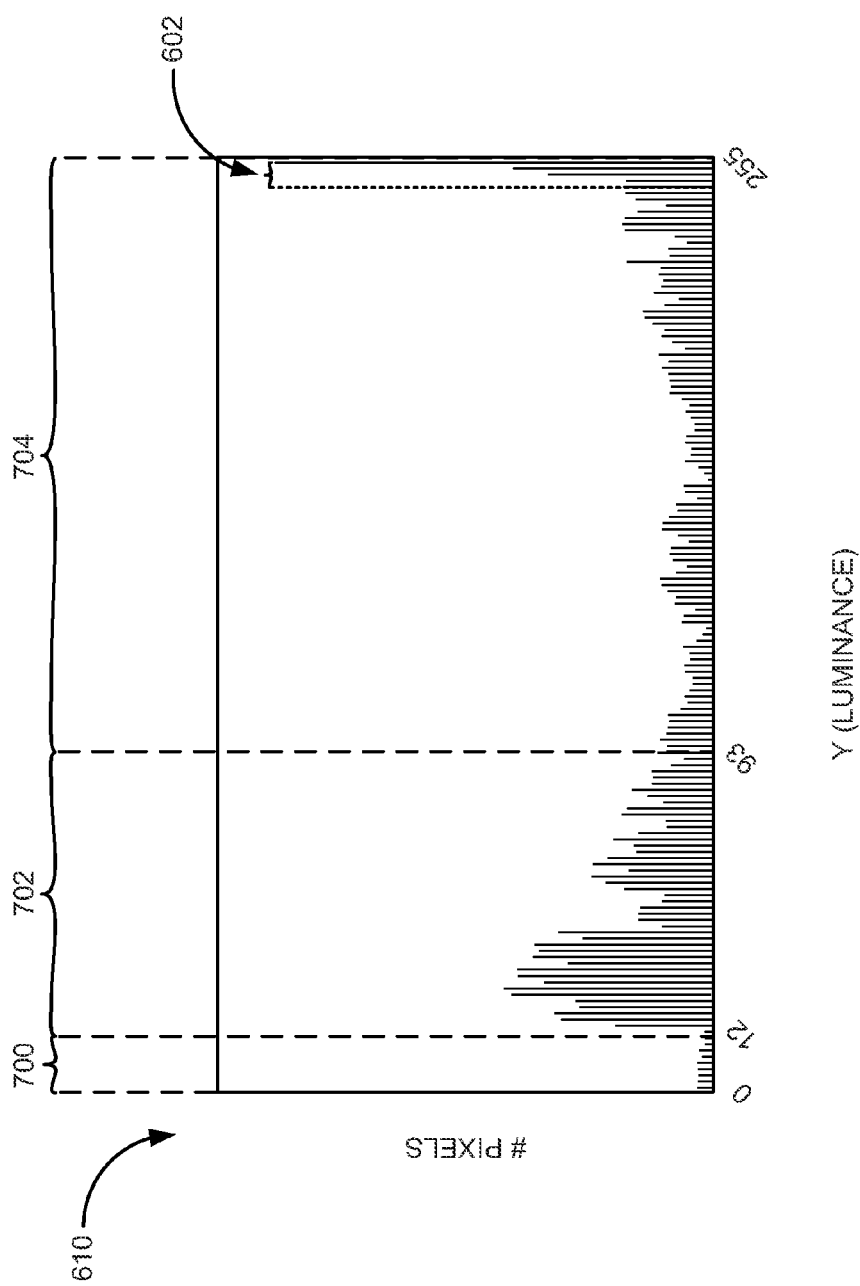
FIG. 7 illustrates a luminance image histogram divided into three portions, in accordance with one embodiment.

Referring now to FIG. 7, a luminance image histogram 600 divided into three portions 700/702/704 is shown, in accordance with one embodiment. In one embodiment, the portions 700/702/704 are defined according to the EV scale, that is, by determining a number of "stops" or "half-stops" of the camera's dynamic range that will be classified as belonging to a particular portion of the image histogram. In photography, increasing the camera's exposure settings by one "stop" results in doubling the amount of light captured by the camera. Using an analog to digital converter (A/D) having 8 bits of precision will provide a contrast ratio of $2^8$, or 256:1. This may also be referred to as having a dynamic range of 8 EV, or 8 "stops." Because there is a logarithmic relationship between luminance intensity values captured by the image sensor and the brightness with which pixels are presented on a display screen, doubling the luminance value of a pixel will not necessarily cause it to appear twice as bright on the display screen. Thus, in one embodiment, the luminance image histogram may be divided into three portions, e.g., lower portion 700, middle portion 702, and upper portion 704—although the choice of having three portions is not strictly necessary. In such an embodiment, the lower portion 700 may comprise roughly the first six half-stops of luminance values, the middle portion 702 may comprise roughly the next six half-stops of luminance values, and the upper portion may comprise the remaining roughly four half-stops of luminance values. By calculating the logarithmic relationship between pixel luminance values and resultant display brightness, one may determine how many "stops" on the EV scale a given pixel luminance value corresponds to. In one embodiment, with 8-bit luminance values, it has been empirically determined that: the lower portion 700 of the histogram should comprise roughly the first six half-stops of luminance values, which corresponds to pixels having luminance values ranging from 0 to 11; the middle portion 702 of the histogram should comprise roughly the next six half-stops of luminance values, which corresponds to pixels having luminance values ranging from 12 to 92; and the upper portion 704 of the histogram should comprise the remaining roughly four half-stops of luminance values, which corresponds to pixels having luminance values ranging from 93 to 255. Different embodiments of the blowout prevention processes described herein may allocate the stops on the EV scale to the various portions of the image histogram differently, or may relate luminance intensity values to exposure stops according to various formulas (dependent on the camera's particular hardware and/or software implementation).

In one embodiment of a "blowout prevention" process described herein, the first stage in determining whether an image histogram is indicative of exposure blowouts involves dividing the image histogram into a number of portions, e.g., three portions 700/702/704, to determine whether the image is a "candidate" for exposure blowouts. In one embodiment, a blowout prevention process may calculate the ratio of the number of pixels in the upper portion of the image histogram to the number of pixels in the lower portion of the image histogram and determine whether the ratio is greater than a first predetermined value. That is, if the image histogram is shifted sufficiently to the upper portion of histogram buckets, the image is a candidate for exposure blowout regions caused by the image capture device's auto exposure algorithm. In one particular embodiment, the first predetermined value used in determining whether an image histogram is a candidate for exposure blowouts will be two. That is, if the ratio of the number of pixels in the upper portion of the image histogram to the number of pixels in the lower portion of the image histogram is greater than two, it shall be determined that the image is a candidate for possessing exposure blowouts. In other embodiments, the histogram may be divided in different ways, e.g., into a different number of portions, or require a different threshold ratio between the number of "upper portion" (i.e., light) pixels and the number of "lower portion" (i.e., dark) pixels in order for the blowout prevention process to adjudge the image histogram to be a candidate for blown out regions, but the general concept remains similar—comparing the number of sufficiently dark pixels in the image to the number of sufficiently light pixels in the image.

Figure 8:
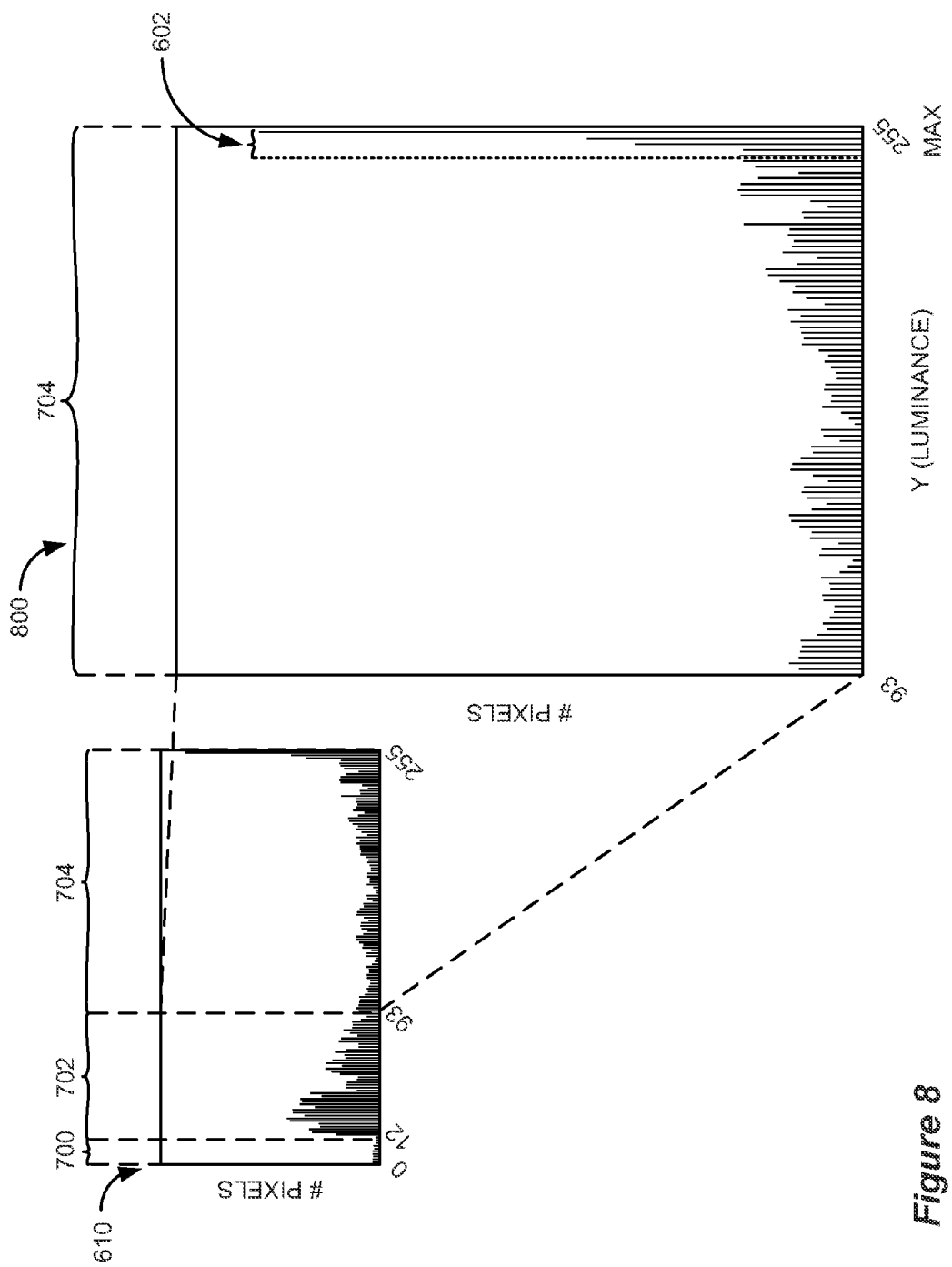
FIG. 8 illustrates a detailed view of the upper portion of a luminance image histogram, in accordance with one embodiment.

Referring now to FIG. 8, a detailed view 800 of the upper portion 704 of a luminance histogram 610 is shown, in accordance with one embodiment. As shown in FIG. 8, in one embodiment having 8-bit luminance values, the upper portion of the image histogram will include pixels with luminance values spanning from roughly 93 all the way up to pixels with the maximum value of 255. In one embodiment of the "blowout prevention" process described herein, if the first stage of the process, described above with reference to FIG. 7, reveals that the image histogram is a candidate for blown out regions, the process may undertake a second stage of processing, i.e., the "confirmation analysis." This so-called "confirmation analysis" may involve comparing the number of pixels in the upper portion 704 of the image histogram to the number of pixels in the highest n-buckets 602 of the image histogram. An appropriate value for 'n' may depend on the amount of sensor noise present in the camera's image sensor. In some embodiments, the value of n may preferably be set to five. The n-highest buckets 602 of the image histogram represent the number of pixels that are either completely blown out, i.e., they have been assigned the maximum possible luminance value and are displayed as pure white, or that are close enough to being completely blown out that image detail is not readily perceptible. By making this second stage or "confirmation analysis" comparison, the blowout prevention process may confirm that the shift of pixels towards the upper portion of the image histogram that was determined by the first stage of the process is indeed due to a number of unwanted blown out or near-blown out pixels (i.e., pixels located in the n-highest buckets 602), rather than merely a concentration of pixels clustered in the upper portion of the image histogram as could be potentially present, e.g., in a correctly exposed image of a predominantly bright scene.

In one embodiment, the confirmation analysis stage of a blowout prevention process may calculate the ratio of the number of pixels in the upper portion of the image histogram to the number of pixels in the highest n-buckets of the image histogram and determine whether the ratio is less than a second predetermined value. That is, if the upper portion of the image histogram is shifted sufficiently to the highest n-buckets of the image histogram, the indicated presence of exposure blowouts may be confirmed. In one particular embodiment, the second predetermined value used in confirming whether an image histogram is indicative of exposure blowouts will be six. That is, if the ratio of the number of pixels in the upper portion of the image histogram to the number of pixels in the highest n-buckets of the image histogram is less than six, it shall be confirmed that the image histogram is indicative of exposure blowouts. That is, a properly exposed image may indeed have a sufficiently greater number of pixels in the upper portion of the image histogram as in the lower portion of the image histogram (thus passing the first stage of the blowout prevention process as being determined to be an image that is a likely candidate for blowouts), but a properly exposed image would likely have more than six times as many pixels in the upper portion of its image histogram as in the highest n-buckets of its image histogram (thus causing the image to fail the second confirmation analysis stage of the blowout prevention process). On the other hand, an image with exposure blowouts would likely have less than six times as many pixels in the upper portion of its image histogram as in the highest n-buckets of its image histogram.

In some embodiments, only an image passing both stages of the blowout prevention process will be treated as being indicative of exposure blowouts. In other embodiments, the second predetermined value may be either higher or lower than six, as may be empirically determined for the particular application. For the sake of demonstration, it is assumed that the detailed view 800 of the upper portion 704 of luminance image histogram 610 shown in FIG. 8 contains a sufficient number of pixels in the highest n-buckets 602 of the image histogram so that the image passes both stages of the blowout prevention process and is determined to be indicative of unwanted exposure blowouts.

Assuming that an image has undergone both stages of histogram analysis and is determined to be indicative of exposure blowouts, one embodiment of the blowout prevention process described herein will, at this point, endeavor to remove the unwanted exposure blowouts from subsequently captured images by gradually adjusting the image capture device's exposure parameter values, e.g., by setting an exposure compensation parameter. The exposure parameters in a typical digital camera or digital video camera are designed to change gradually in order to reduce the occurrence of any visually jarring changes on the preview screen of the camera device. For example, if the camera's exposure parameters were changed rapidly in response to rapidly changing lighting levels in the user's environment, it could lead to undesirable flickering on the camera device's preview screen. Thus, in one embodiment of the blowout prevention process described herein, to achieve this gradual changing of the exposure parameter values, the exposure parameter values may be changed in incremental steps of a predetermined step size for subsequently captured image frames. In one embodiment, the exposure parameter values may be changed for each subsequently captured image frame.

Figure 9:
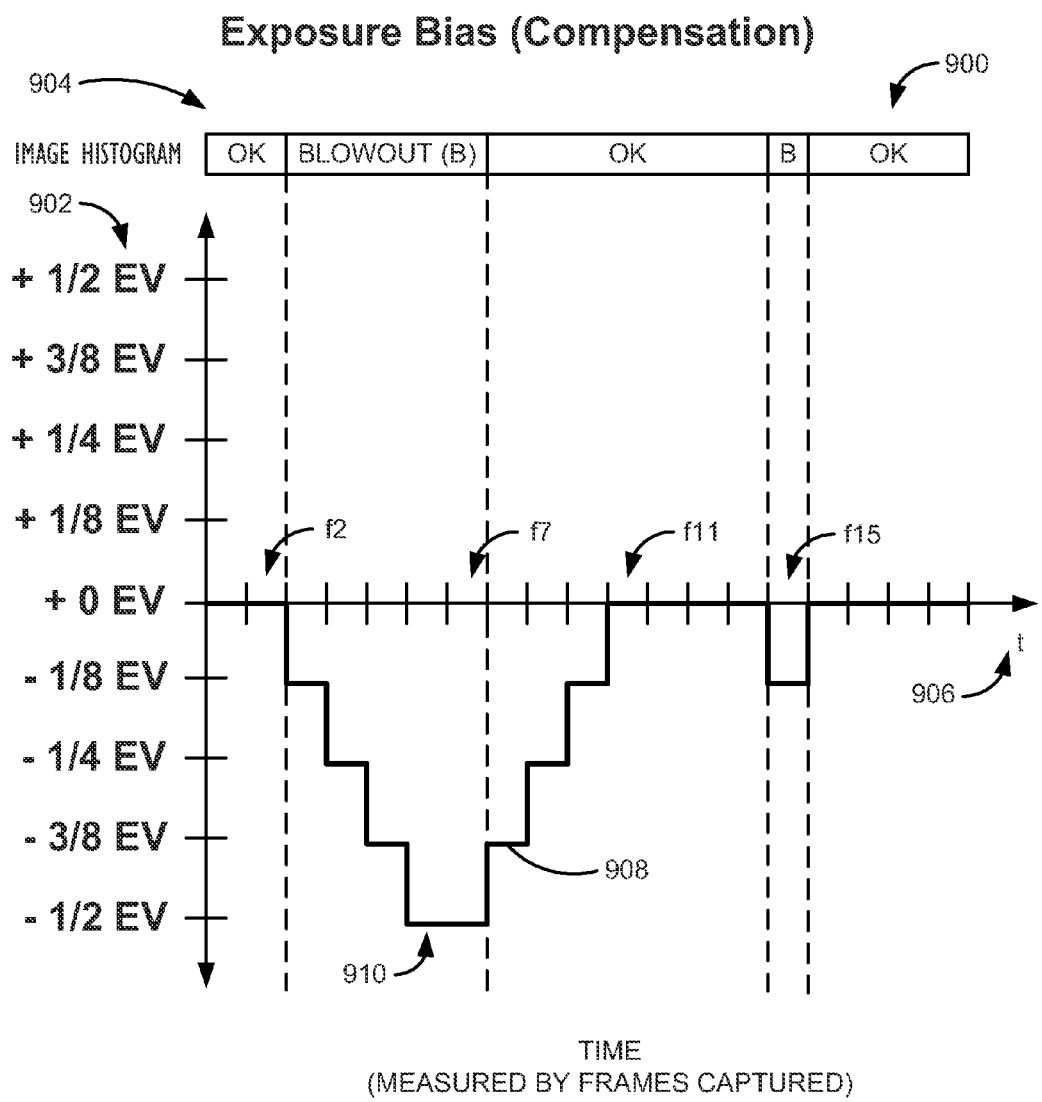
FIG. 9 illustrates a graph representative of the exposure compensation set by a blowout prevention process over time, in accordance with one embodiment.

Referring now to FIG. 9, a graph 900 representative of the exposure bias (or, exposure compensation) set over time by one particular embodiment of a blowout prevention process is shown. The x-axis 906 of graph 900 represents the passage of time, as measured by subsequently captured frames by the camera's image sensor. The "exposure bias" or "exposure compensation" is indicated along the y-axis 902 of graph 900 and represents changes made to the camera's EV in addition to the changes that were suggested by the camera's auto exposure algorithm. In graph 900, the upper and lower limits of exposure compensation are shown as being plus and minus one half of a stop (+/−½ EV). In the particular embodiment described with reference to FIG. 9, the camera's exposure bias values are incremented or decremented by one-eighth of a stop per captured frame, limited by some upper and lower limits, until the image histogram is no longer indicative of blown out regions. The choice of a one-eighth stop exposure compensation step size per captured frame is not strictly necessary, and different exposure compensation step sizes may be chosen for adjustments that increase the amount of exposure compensation and adjustments that decrease the amount of exposure compensation.

Status bar 904 across the top of graph 900 indicates the current status of the image's histogram. A status of 'OK' in status bar 904 indicates that the image is not indicative of exposure blowouts. For example, for the first two captured frames in the example depicted in graph 900, the image's histogram is not indicative of exposure blowouts, and thus, the exposure bias line 908 remains flat at 0 EV of compensation. However, after the second captured frame (labeled f2 along x-axis 906), the image histogram has been analyzed by a blowout prevention process and determined to be indicative of blowouts, e.g., due to a change in the scene's composition between captured frames two and three. This determination may have been made, e.g., after the image's histogram was analyzed according to the two stage blowout prevention process described above with reference to FIGS. 7 and 8. Accordingly, for captured frames 3 through 7, the status bar 904 indicates a status of 'BLOWOUT (B).' Thus, beginning with frame 3, the exposure bias line 908 shifts down by ⅛ of a stop (i.e., −⅛ EV) of compensation per captured frame for as long as the image histogram is still indicative of blowouts. As mentioned above, the exposure compensation levels indicated by graph 900 are to be imposed in addition to the exposure value that is calculated by the camera's auto exposure algorithm. By captured frame 6, the exposure compensation has reached its lower limit value of −½ EV 910. However, the status bar 904 indicates that the image histogram is still indicative of exposure blowouts, so the exposure compensation level will remain at the lower limit of −½ EV compensation for the duration of frame 7. By frame 8, however, according to status bar 904, the image's histogram is no longer indicative of exposure blowouts, so the exposure compensation 908 gradually moves back towards 0 EV of compensation by the same one-eighth of a stop per frame interval. Thus, by frame 11, the camera will be back to no exposure compensation, i.e., the camera's exposure settings will be controlled purely by the camera's auto exposure algorithm.

In certain embodiments of the blowout prevention process, there may be a "threshold range" for the second stage, i.e., the confirmation analysis stage, of the blowout prevention process, wherein the EV compensation for the camera is neither increased nor decreased between consecutive frames, but rather held steady at its current level. For example, as stated above in reference to FIG. 8, one embodiment of a blowout prevention process may confirm the presence of exposure blowouts in the second stage of the process if the number of pixels in the highest n-buckets is one-sixth or more of the total number of pixels in the upper portion of the image histogram. However, in one embodiment of a blowout prevention process employing a "threshold range," while the exposure compensation level may be increased if the number of pixels in the highest n-buckets is one-sixth or more of the total number of pixels in the upper portion of the image histogram, the exposure compensation level may only be decreased when the number of pixels in the highest n-buckets is less than, e.g., one-seventh of the total number of pixels in the upper portion of the image histogram. If the number of pixels in the highest n-buckets is between one-seventh and one-sixth of the total number of pixels in the upper portion of the image histogram, the exposure compensation may be held steady at its current level.

In other words, in such embodiments wherein the image histogram is no longer indicative of exposure blowouts, the exposure compensation level will be held steady unless the ratio of the number of pixels in the upper portion of the histogram to the number of pixels in the highest n-buckets of the histogram exceeds a predetermined value by a threshold amount. Employing such a "threshold range" technique may serve to help further reduce jarring oscillations on the camera device's preview screen. Whether or not to use such a "threshold range," and how large to make such a threshold range value may be left to the particular implementation of a blowout prevention process.

It should also be noted that similar auto exposure blowout prevention techniques could be applied to the most shadowy regions of an image as well, i.e., "dark blowouts"—those regions of the image where, due to the camera's exposure settings, shadow detail is lost and the pixels in the most shadowy regions of the image are rendered as pure black. For example, instead of moving the camera's exposure bias 908 down the y-axis 902 of graph 900 by an eighth of a stop per captured frame while the image histogram remained indicative of unwanted highlight blowouts, a "dark blowout prevention" process could instead move the camera's exposure bias 908 up the y-axis 902 of graph 900 by an eighth of a stop per captured frame while the image histogram remained indicative of dark blowouts. Exposure compensation for dark blowouts could likewise have an upper limit of one half of a stop (+½ EV). The determination and prevention of "dark blowouts" could potentially utilize different upper portion and lower portion definitions than the highlight blowout process described above in reference to FIG. 7, as well as a different thresholds than those used in the highlight blowout "confirmation analysis" described above in reference to FIG. 8. While such "dark blowout" prevention corrective techniques are possible alone, or in conjunction with highlight blowout prevention corrective techniques, exposure blowouts in the darkest regions of an image are usually not as noticeable or important to correct as the overexposed blown out highlights in the brightest regions of the image.

As mentioned above, one benefit of using this gradual exposure compensation scheme and/or the threshold range scheme is that very brief periods of exposure blowouts or falsely-indicated exposure blowouts will not cause jarring visual effects on the camera's preview screen. For example, as can be seen during frame 15 on graph 900, the image histogram was only indicative of blown out regions for a single captured frame, thus, the most that the auto exposure algorithm's determinations would have been corrected for by the blowout prevention process' exposure compensation would be one-eighth of a stop (or whatever the minimum step adjustment size may be) during frame 15. It is also advantageous to correct the camera's exposure settings over multiple frames because it is not possible to assess from a given image histogram indicative of either highlight blowouts or dark blowouts exactly what image information exists above the '255' bucket or below the '0' bucket of the histogram—and how far above or below the limits of the histogram the image information truly lies. Thus, by bringing the "hidden image information" (i.e., that image detail that has been moved outside of the camera's dynamic range by either underexposure or overexposure) back into the image histogram gradually, it can be assured that all relevant image detail is displayed and that exposure is corrected by the smallest possible amount from the auto exposure algorithm's determinations.

Figure 10:
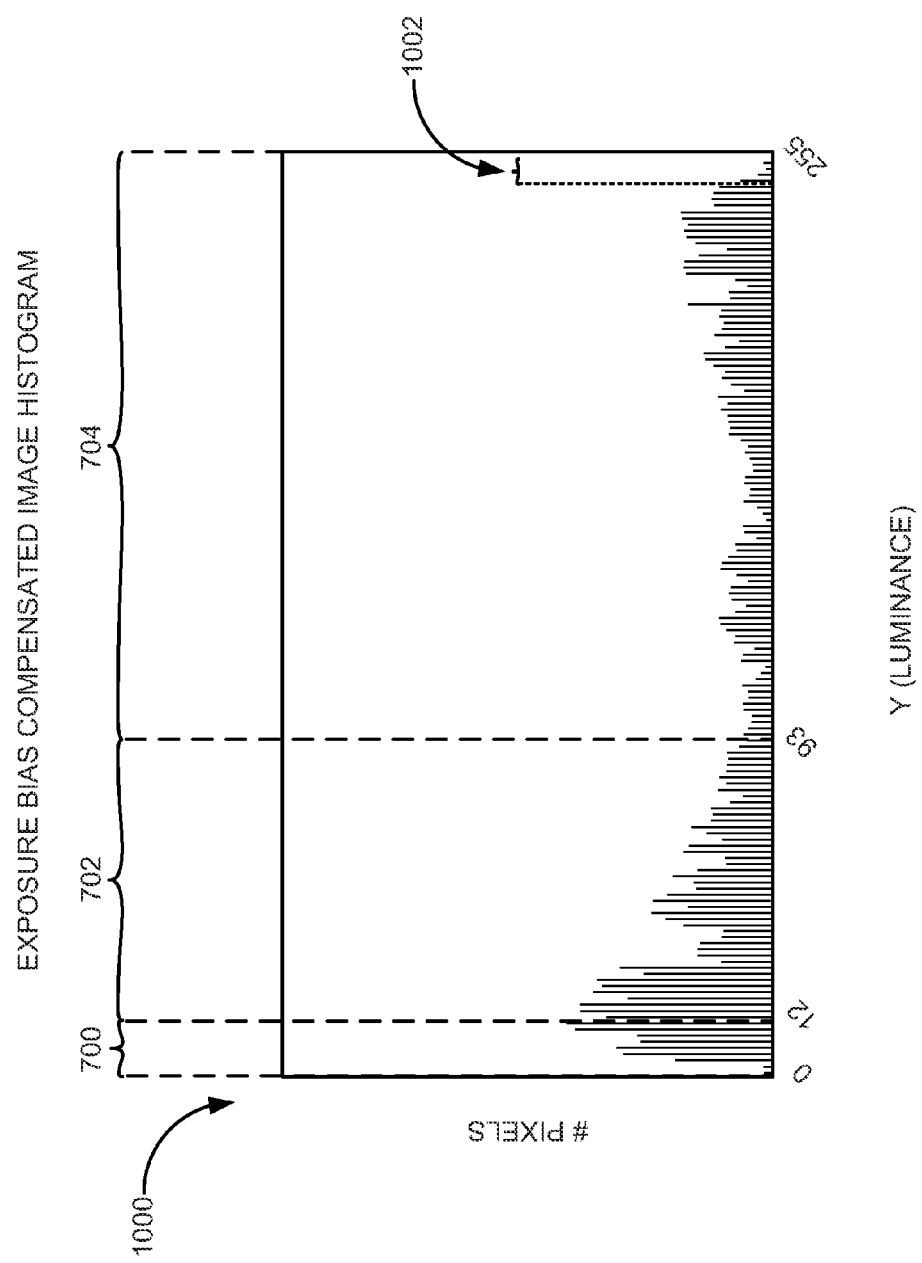
FIG. 10 illustrates an exposure bias corrected image histogram, in accordance with one embodiment.

Referring now to FIG. 10, an exposure bias corrected image histogram 1000 is shown, in accordance with one embodiment. The exposure bias corrected image histogram 1000 shown in FIG. 10 may, e.g., be indicative of the image luminance histogram 610 shown in FIG. 6 after the blowout prevention process has successfully corrected the exposure of the camera to the point where the image's current luminance histogram 1000 is no longer indicative of blown out regions. As is shown in FIG. 10, there is no longer a significant number of pixels in the highest n-buckets 1002 of the image histogram 1000. This means that all the pixels whose values were previously blown out (i.e., were set to pure white) or nearly blown out because their captured brightness levels were greater than the camera's image sensor was capable of capturing, have now been shifted down in the image histogram into the range of viewable, non-blown out pixel values. One aspect of the auto exposure blowout prevention techniques described herein is to make the image histogram as "wide" as the image sensor's dynamic range will allow. That is, it is sometimes desirable to have the most amount of image information possible in the image, rather losing image information in blown out or nearly blown out pixels.

Figure 11:
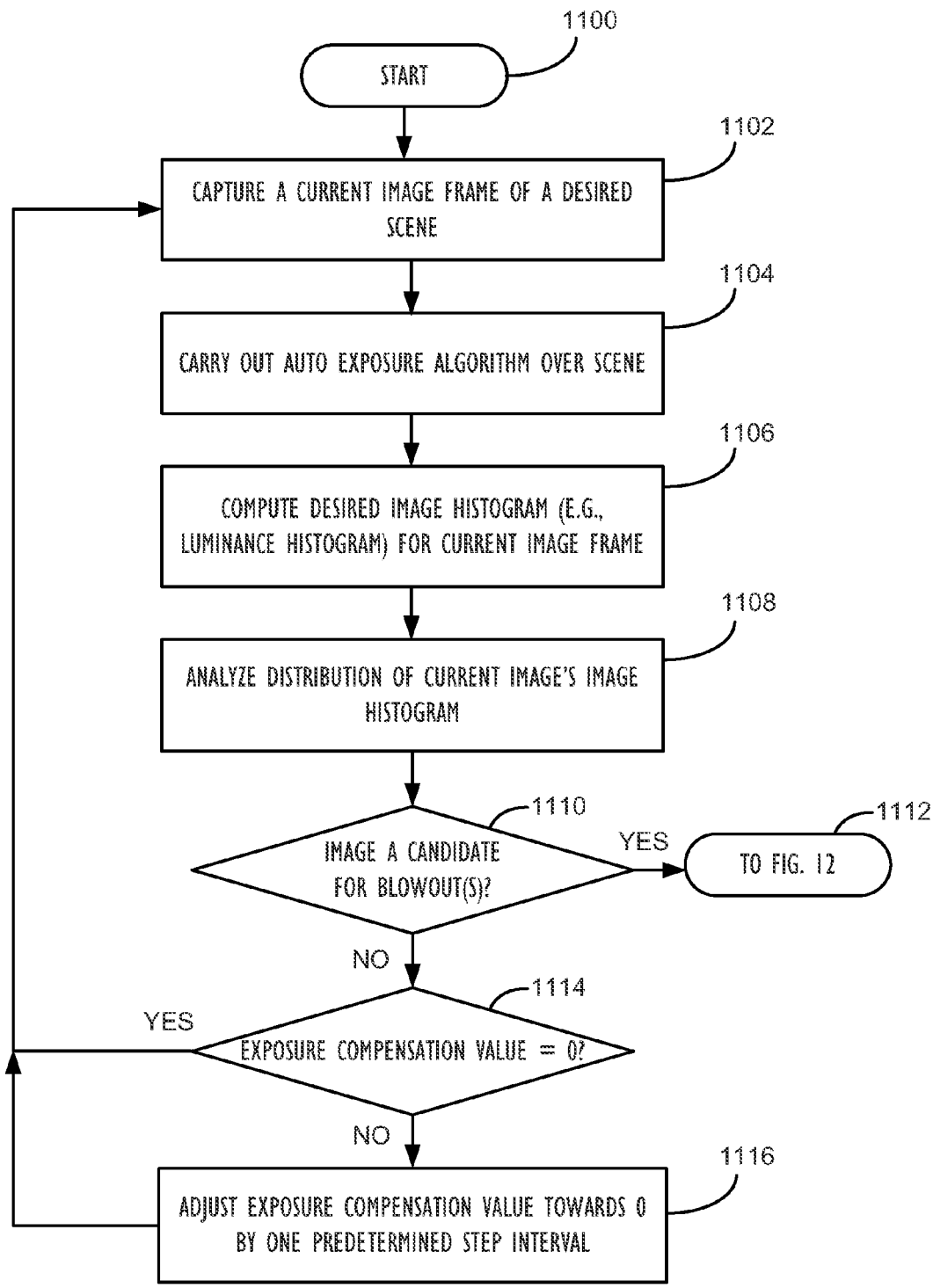
FIG. 11 illustrates, in flowchart form, one embodiment of a process for performing auto exposure blowout prevention.

FIG. 11 illustrates, in flowchart form, one embodiment of a process for performing auto exposure blowout prevention. First, the process begins at Step 1100. Next, the process proceeds with an image capture device's image sensor capturing a current image frame of a desired scene (Step 1102). Next the image capture device may carry out an auto exposure algorithm over the scene (Step 1104). The auto exposure algorithm employed in Step 1104 may be one of many auto exposure techniques known in the art, such as: mean, median, weighted, center-weighted, or matrix metering methods. Next, the auto exposure blowout prevention process may compute the desired image histogram (e.g., a pure luminance histogram) for the current image frame (Step 1106). Next, the auto exposure blowout prevention process may analyze the distribution of the current image's histogram to determine whether it is a candidate for exposure blowouts (Step 1108). In one embodiment, this analysis may comprise comparing the number of pixels in the upper portion of the image histogram to the number of pixels in the lower portion of the image histogram. If, at this point, the image histogram analysis meets the predetermined criteria and the image histogram is deemed to be a candidate for exposure blowouts (Step 1110), the process may proceed to Step 1200 of the flow chart shown in FIG. 12 (Step 1112). If instead at Step 1110, the image histogram is deemed to not be a candidate for exposure blowouts, the process will proceed to Step 1114. At Step 1114, the process may check the current exposure compensation value. If there is currently no exposure compensation being employed, i.e., the EV compensation equals zero, the process may return to Step 1102 and continue the process of capturing and exposing subsequent images. If instead at Step 1114, the EV compensation does not equal zero, the process will proceed to Step 1116. At this point, it has been determined that the image does not have exposure blowouts, but the blowout prevention process is currently correcting exposure to some degree, thus, the blowout prevention process may adjust the exposure compensation value towards zero by one predetermined step interval (Step 1116). In one embodiment, the predetermined step interval may be set at one-eighth of a stop per captured frame. After making the necessary adjustments to the image capture device's exposure compensation value, the process may return to Step 1102 and continue the process of capturing and exposing subsequent images.

Figure 12:
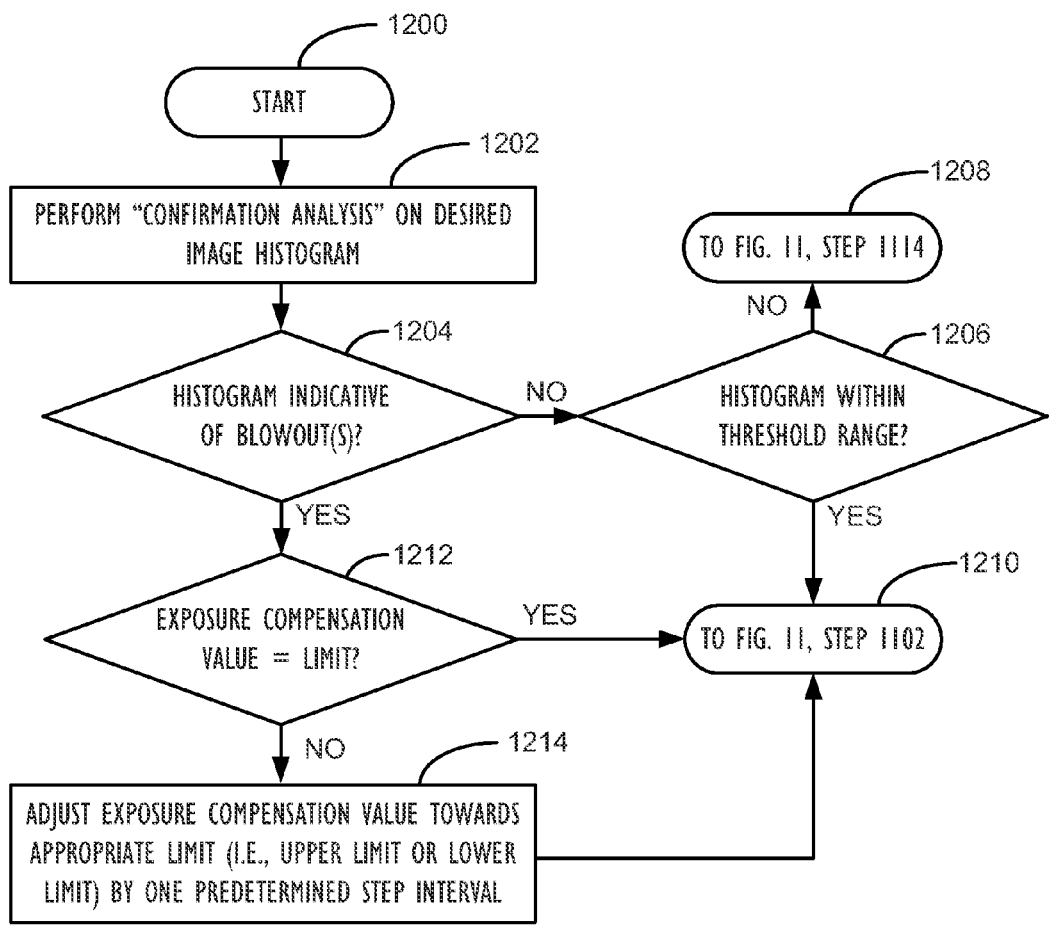
FIG. 12 illustrates, in flowchart form, one embodiment of a confirmation analysis process for performing auto exposure blowout prevention.

FIG. 12 illustrates, in flowchart form, one embodiment of a confirmation analysis process for performing auto exposure blowout prevention. First, the process begins at Step 1200. Next, the process proceeds to perform the desired "confirmation analysis" on the image histogram data (Step 1202). In one embodiment, this may comprise comparing the number of pixels in the upper portion of the image histogram to the number of pixels in the highest n-buckets of the image histogram. If, after the "confirmation analysis," the image histogram is adjudged to not be indicative of blowouts (Step 1204), the process may subsequently determine whether the histogram is within a "threshold range" of being indicative of blowouts (Step 1206). If the histogram is not within a "threshold range" of being indicative of blowouts, the process may return to Step 1114 in FIG. 11 (Step 1208), which will begin to correct the image capture device's exposure bias back towards zero if necessary. If instead at Step 1206, the histogram is within a "threshold range" of being indicative of blowouts, the process may return to Step 1102 in FIG. 11 (Step 1210), which will maintain the image capture device's exposure bias at its current level. Returning to Step 1204, if the image histogram is indicative of blowouts after the "confirmation analysis" is performed, the process may next check to see if the current exposure compensation is at its limit, i.e., its predefined upper limit or lower limit (Step 1212). If the exposure compensation is currently at its limit (e.g., a minimum limit of −½ EV for highlight blowouts or a maximum limit of +½ EV for dark blowouts), the process may return to Step 1102 in FIG. 11 (Step 1210), which will continue to correct the image capture device's exposure bias by the maximum predetermined amount so long as the image histogram is still indicative of exposure blowouts. If instead at Step 1212, the exposure compensation is not currently at its upper or lower limit, the process may continue to Step 1214. At Step 1214, the auto exposure blowout prevention process will adjust the exposure compensation value towards the appropriate limit by one predetermined step interval. For example, if the blowout prevention process is correcting for blown out highlights, the exposure compensation value may be adjusted by one predetermined step size towards the lower limit of permissible exposure compensation values, e.g., −½ EV. If instead, the blowout prevention process is correcting for dark blowouts, the exposure compensation value may be adjusted by one predetermined step size towards the upper limit of permissible exposure compensation values, e.g., +½ EV. At this point, the process could proceed to Step 1102 in FIG. 11 (Step 1210), which will cause the image capture device to begin using the newly adjusted exposure compensation value set during Step 1214.

Figure 13:
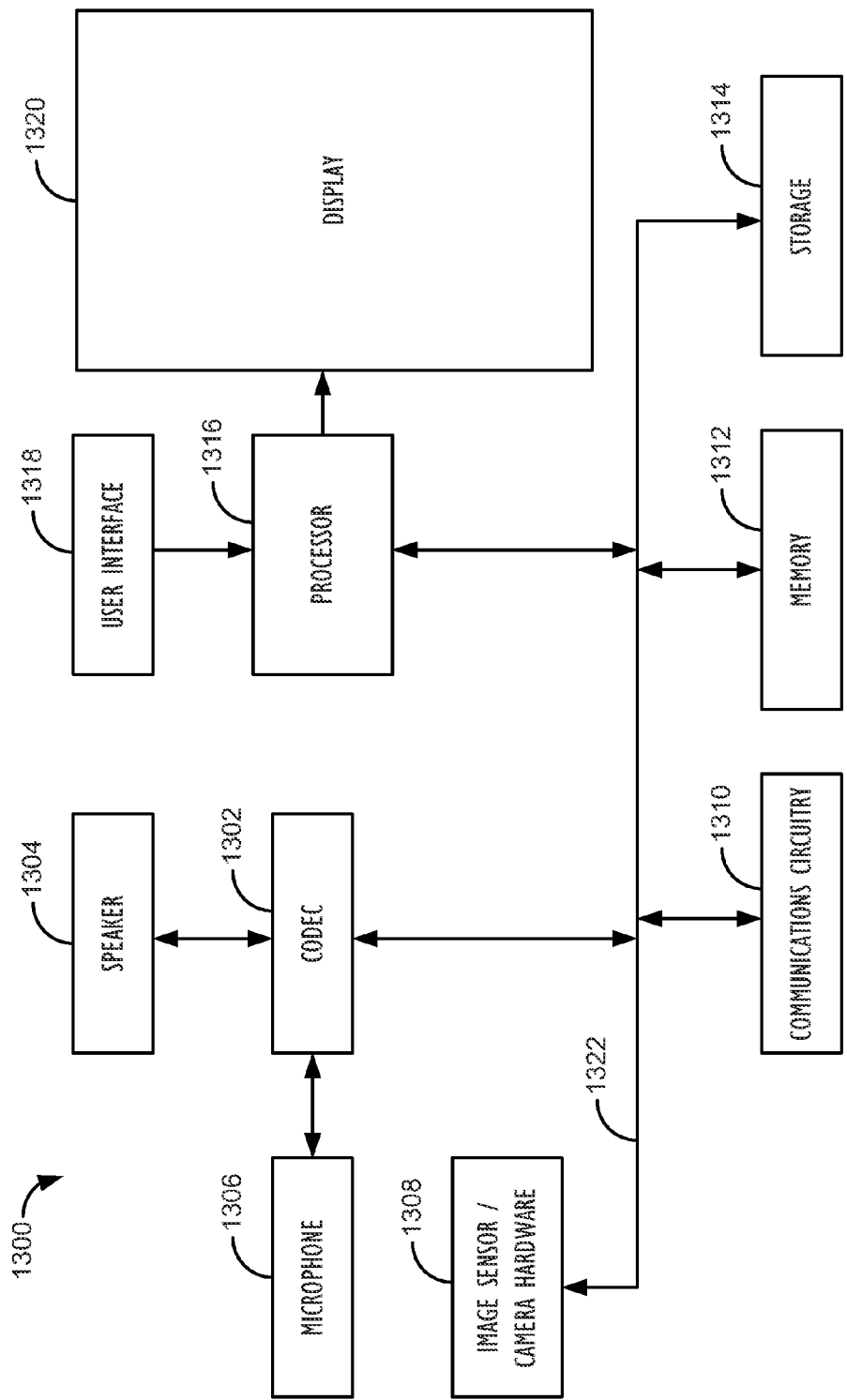
FIG. 13 illustrates a simplified functional block diagram of a personal electronic device, in accordance with one embodiment.

Referring now to FIG. 13, a simplified functional block diagram of a representative personal electronic device 1300 according to an illustrative embodiment is shown, e.g., a mobile phone possessing an image capture or video capture device, such as camera device 208. The personal electronic device 1300 may include a programmable control device, such as processor 1316, storage device 1314, user interface 1318, display 1320, coder/decoder (CODEC) 1302, bus 1322, memory 1312, communications circuitry 1310, a speaker or transducer 1304, a microphone 1306, and an image sensor with associated camera hardware 1308. Processor 1316 may be any suitable programmable control device and may control the operation of many functions, such as the auto exposure blowout prevention methods discussed above, as well as other functions performed by personal electronic device 1300. Processor 1316 may drive display 1320 and may receive user inputs from the user interface 1318.

Storage device 1314 may store media (e.g., photo and video files), software (e.g., for implementing various functions on device 1300), preference information (e.g., media playback preferences), personal information, and any other suitable data. Storage device 1314 may include one more storage mediums, including for example, a hard-drive, permanent memory such as ROM, semi-permanent memory such as RAM, cache, or any other form of electrically or optically readable/writeable memory.

Memory 1312 may include one or more different types of memory which may be used for performing device functions. For example, memory 1312 may include cache, ROM, and/or RAM. Bus 1322 may provide a data transfer path for transferring data to, from, or between at least storage device 1314, memory 1312, and processor 1316. CODEC 1302 may be included to convert digital audio signals into analog signals for driving the speaker 1304 to produce sound including voice, music, and other like audio. The CODEC 1302 may also convert audio inputs from the microphone 1306 into digital audio signals for storage .in memory 1312 or storage 1314. The CODEC 1302 may include a video CODEC for processing digital and/or analog video signals.

User interface 1318 may allow a user to interact with personal electronic device 1300. For example, the user input device 1318 can take a variety of forms, such as a button, keypad, dial, a click wheel, or a touch screen. Communications circuitry 1310 may include circuitry for wireless communication (e.g., short-range and/or long range communication). For example, the wireless communication circuitry may be Wi-Fi® enabling circuitry that permits wireless communication according to one of the 802.11 standards. (Wi-Fi® is a registered trademark of the Wi-Fi Alliance.) Other wireless network protocols standards could also be used, either as an alternative to the identified protocols or in addition to the identified protocols. Other network standards may include BLUETOOTH®, the Global System for Mobile Communications (GSM®), and code division multiple access (CDMA) based wireless protocols. (BLUETOOTH® is a registered trademark of Bluetooth SIG, Inc., and GSM® is a registered trademark of GSM Association.) Communications circuitry 1310 may also include circuitry that enables device 1300 to be electrically coupled to another device (e.g., a computer or an accessory device) and communicate with that other device.

In one embodiment, the personal electronic device 1300 may be a personal electronic device dedicated to processing media such as audio and video. For example, the personal electronic device 1300 may be a media device such as a media player, e.g., an MP3 player, a game player, a remote controller, a portable communication device, a remote ordering interface, or other suitable personal device. The personal electronic device 1300 may be battery-operated and highly portable so as to allow a user to listen to music, play games or video, record video, stream video, take pictures, communicate with others, and/or control other devices. In addition, the personal electronic device 1300 may be sized such that it fits relatively easily into a pocket or hand of the user. By being handheld, the personal computing device 1300 may be relatively small and easily handled and utilized by its user and thus may be taken practically anywhere the user travels.

As discussed previously, the relatively small form factor of certain types of personal electronic devices 1300, e.g., personal media devices, enables a user to easily manipulate the device's position, orientation, and movement. Accordingly, the personal electronic device 1300 may provide for improved techniques of sensing such changes in position, orientation, and movement to enable a user to interface with or control the device 1300 by affecting such changes. Further, device 1300 may include a vibration source, under the control of processor 1316, for example, to facilitate sending motion, vibration, and/or movement information to a user related to an operation of the device 1300. The personal electronic device 1300 may also include an image sensor and associated camera hardware 1308 that enables the device 1300 to capture an image or series of images, i.e., video, continuously, periodically, at select times, and/or under select conditions.

The foregoing description is not intended to limit or restrict the scope or applicability of the inventive concepts conceived of by the Applicants. As one example, although the present disclosure focused on solutions for preventing blowouts caused by an image capture device's auto exposure mechanism; it will be appreciated that the teachings of the present disclosure can be applied to other contexts, e.g., medical imaging, where any loss of image information could potentially be undesirable. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. An auto exposure blowout prevention system comprising:
    an image capture device for capturing an image representative of a scene;
    a memory coupled to the image capture device; and
    a programmable control device communicatively coupled to the memory, wherein the memory includes instructions for causing the programmable control device to perform a method comprising:
        obtaining image histogram information representative of the image;
        analyzing a distribution of the image histogram information, wherein the act of analyzing comprises comparing a number of pixels in an upper portion of the image histogram to a number of pixels in the highest n-buckets of the image histogram;
        determining whether the distribution of the image histogram information is indicative of the presence of exposure blowouts in the image based at least in part on the act of analyzing; and
        setting an exposure compensation parameter for the image capture device based at least in part on the act of determining.

2. The auto exposure blowout prevention system of claim 1, wherein the programmed act of analyzing a distribution of the image histogram information further comprises comparing the number of pixels in the upper portion of the image histogram to a number of pixels in a lower portion of the image histogram.

3. The auto exposure blowout prevention system of claim 2, wherein the programmed act of determining whether the distribution of the image histogram is indicative of the presence of exposure blowouts in the image comprises determining whether the ratio of the number of pixels in the upper portion of the image histogram to the number of pixels in the lower portion of the image histogram is greater than a first predetermined value.

4. The auto exposure blowout prevention system of claim 3, wherein the programmed act of determining whether the distribution of the image histogram is indicative of the presence of exposure blowouts in the image further comprises determining whether the ratio of the number of pixels in the upper portion of the image histogram to the number of pixels in the highest n-buckets of the image histogram is less than a second predetermined value.

5. The auto exposure blowout prevention system of claim 4, wherein the first predetermined value is two, and wherein the second predetermined value is six.

6. The auto exposure blowout prevention system of claim 4, wherein the act of analyzing comprises dividing the image histogram into three portions, wherein the three portions comprise an upper portion, a middle portion, and a lower portion.

7. The auto exposure blowout prevention system of claim 4, wherein the programmed act of setting an exposure compensation parameter for the image capture device based at least in part on the determination of the indication of the presence of exposure blowouts in the image comprises increasing the exposure compensation parameter by a third predetermined value when a determination is made that the image histogram information is indicative of the presence of exposure blowouts in the image.

8. The auto exposure blowout prevention system of claim 7, wherein the programmed act of setting an exposure compensation parameter for the image capture device based at least in part on the determination of the indication of the presence of exposure blowouts in the image comprises decreasing the exposure compensation parameter by a fourth predetermined value when a determination is made that the image histogram information is not indicative of the presence of exposure blowouts in the image.

9. The auto exposure blowout prevention system of claim 8, wherein the third predetermined value is one-eighth of a stop, and wherein the fourth predetermined value is one-eighth of a stop.

10. The auto exposure blowout prevention system of claim 8, wherein the exposure compensation parameter has a maximum possible value and a minimum possible value.

11. The auto exposure blowout prevention system of claim 10, wherein the maximum possible value is one-half of a stop, and wherein the minimum possible value is zero stops.

12. A computer usable medium having a computer readable program code embodied therein, wherein the computer readable program code is adapted to be executed to implement the method that the programmable control device of claim 1 is programmed to perform.

13. A method of performing auto exposure blowout prevention for an image capture device, the method comprising:
obtaining an image from the image capture device;
computing a histogram for the image;
performing a first comparison comprising comparing a number of pixels in an upper portion of the histogram with a number of pixels in a lower portion of the histogram;
performing a first determination comprising determining whether the first comparison exceeds a first predetermined condition;
performing a second comparison comprising comparing a number of pixels in the highest n-buckets of the histogram with the number of pixels in the upper portion of the histogram;
performing a second determination comprising determining whether the second comparison exceeds a second predetermined condition; and
adjusting an exposure compensation parameter for the image capture device based at least in part on the first determination and the second determination.

14. The method of claim 13, wherein the upper portion of the histogram comprises a first predetermined number of the highest stops of the image capture device's dynamic range, and wherein the lower portion of the histogram comprises a second predetermined number of the lowest stops of the image capture device's dynamic range.

15. The method of claim 13, wherein the first predetermined condition comprises the presence of greater than a first predetermined ratio of pixels in the upper portion of the histogram to pixels in the lower portion of the histogram.

16. The method of claim 15, wherein the second predetermined condition comprises the presence greater than a second predetermined ratio of pixels in the highest n-buckets of the histogram to pixels in the upper portion of the histogram.

17. The method of claim 16, wherein the act of adjusting an exposure compensation parameter for the image capture device based at least in part on the first determination and the second determination further comprises increasing the exposure compensation parameter for the image capture device if the first determination determines that the first comparison exceeds the first predetermined condition and the second determination determines that the second comparison exceeds the second predetermined condition.

18. The method of claim 17, wherein the act of adjusting an exposure compensation parameter for the image capture device based at least in part on the first determination and the second determination further comprises decreasing the exposure compensation parameter for the image capture device if either the first determination determines that the first comparison does not exceed the first predetermined condition or the second determination determines that the second comparison does not exceed the second predetermined condition.

19. The method of claim 18, wherein the exposure compensation parameter has a maximum possible value and a minimum possible value.

20. The method of claim 19, wherein the maximum possible value is one-half of a stop, and wherein the minimum possible value is zero stops.

21. The method of claim 20, wherein the act of increasing the exposure compensation parameter for the image capture device comprises increasing the exposure value of the image capture device by a first predetermined number of stops, and wherein the act of decreasing the exposure compensation parameter for the image capture device comprises decreasing the exposure value of the image capture device by a second predetermined number of stops.

22. A method of performing auto exposure blowout prevention for an image capture device, the method comprising:
obtaining an image from the image capture device;
computing a histogram for the image;
comparing the number of pixels in an upper portion of the histogram to the number of pixels in a lower portion of the histogram;
comparing the number of pixels in the highest n-buckets of the histogram with the number of pixels in the upper portion of the histogram;
increasing an exposure compensation parameter for the image capture device if:
(a) the ratio of the number of pixels in the upper portion of the histogram to the number of pixels in the lower portion of the histogram exceeds a first predetermined value and
(b) the ratio of the number of pixels in the upper portion of the histogram to the number of pixels in the highest n-buckets of the histogram does not exceed a second predetermined value; and
decreasing the exposure compensation parameter for the image capture device if:
condition (a) is not met, or condition (a) is met and the ratio of the number of pixels in the upper portion of the histogram to the number of pixels in the highest n-buckets of the histogram exceeds the second predetermined value by a threshold range value.

23. The method of claim 22, wherein the exposure compensation parameter for the image capture device is changed at most once per image obtained from the image capture device.

24. The method of claim 22, wherein the exposure compensation parameter for the image capture device has a maximum value of one half of a stop.

25. The method of claim 22, wherein the exposure compensation parameter for the image capture device has a minimum value of zero stops.

26. A method of performing auto exposure blowout prevention for an image capture device, the method comprising:
   obtaining an image from the image capture device;
   computing a histogram for the image;
   analyzing a distribution of the image histogram, wherein the act of analyzing comprises comparing a number of pixels in an upper portion of the image histogram to a number of pixels in the highest n-buckets of the image histogram;
   determining whether the distribution of the image histogram is indicative of the presence of exposure blowouts in the image based at least in part on the act of analyzing; and
   adjusting an exposure compensation value for the image capture device based at least in part on the determination of the indication of the presence of exposure blowouts in the image,
   wherein the exposure compensation value for the image capture device is adjusted by a predetermined step size.

27. The method of claim 26, wherein the exposure compensation value is adjusted at most once per image obtained from the image capture device.

* * * * *